(12) United States Patent
Yin et al.

(10) Patent No.: US 10,994,935 B1
(45) Date of Patent: May 4, 2021

(54) LARGE-SPAN BULK MATERIAL CONVEYING SYSTEM

(71) Applicant: CHANGSHA UNIVERSITY OF SCIENCE AND TECHNOLOGY, Hunan (CN)

(72) Inventors: Lairong Yin, Hunan (CN); Yang Liu, Hunan (CN); Juan Huang, Hunan (CN); Shuo Cai, Hunan (CN); Peng Xu, Hunan (CN); Lin Hu, Hunan (CN); Le Xiao, Hunan (CN); Long Huang, Hunan (CN)

(73) Assignee: Changsha University of Science and Technology, Changsha (CN)

( * ) Notice: Subject to any disclaimer, the term of this patent is extended or adjusted under 35 U.S.C. 154(b) by 0 days.

(21) Appl. No.: 17/139,563

(22) Filed: Dec. 31, 2020

Related U.S. Application Data (63) Continuation of application No. PCT/CN2019/119316, filed on Nov. 19, 2019.

(30) Foreign Application Priority Data

Oct. 16, 2019 (CN) .......................... 201910984451.6

(51) Int. Cl.
- *B65G 15/26* (2006.01)
- *B65G 67/00* (2006.01)
- *B65G 67/60* (2006.01)

(52) U.S. Cl.
CPC .......... *B65G 15/26* (2013.01); *B65G 2201/04* (2013.01)

(58) Field of Classification Search
None
See application file for complete search history.

(56) References Cited

U.S. PATENT DOCUMENTS

| 2,704,148 | A | * | 3/1955 | Burrows | .............. | B65G 67/603 |
| | | | | | | 414/140.8 |
| RE26,298 | E | * | 11/1967 | Oury | ..................... | B65G 37/00 |
| | | | | | | 198/617 |
| 4,082,181 | A | * | 4/1978 | Berthold | .............. | B65G 67/606 |
| | | | | | | 198/591 |

(Continued)

FOREIGN PATENT DOCUMENTS

| CN | 1045251 A | 9/1990 |
| CN | 201220862 Y | 4/2009 |

(Continued)

*Primary Examiner* — Kavel Singh (57) ABSTRACT

Disclosed a large-span bulk material conveying system, including a folding arm conveyor and a dike-striding elevation-type feeding conveying device. The folding arm conveyor is mainly composed of an undercarriage mounted on the ground of a stockyard, a tower body mounted on the undercarriage and provided with a gyration apparatus and a hopper, a balance arm provided with a balance trolley, a conveying arm provided with a portal frame I, a portal frame II and an unloading trolley, a tower top and other main components, wherein the balance arm, the conveying arm and the tower top are mounted on the tower body. The folding arm conveyor can rotate horizontally, and the conveying arm can be folded and retracted by controlling the wire rope by the windlass, so that the folding arm conveyor can be prevented from colliding with other devices or buildings during the rotation.

9 Claims, 8 Drawing Sheets

(56) References Cited

U.S. PATENT DOCUMENTS

| | | | | |
|---|---|---|---|---|
| 5,271,701 | A | * | 12/1993 | Hopland ............... B65G 67/603 414/139.7 |
| 5,456,560 | A | * | 10/1995 | Rudolf, III ........... B65G 67/603 414/139.7 |
| 5,501,563 | A | * | 3/1996 | Grathoff ................. B63B 27/28 414/137.1 |
| 5,538,382 | A | * | 7/1996 | Hasegawa ............ B65G 67/603 212/319 |
| 5,871,324 | A | * | 2/1999 | Horak .................... B63B 27/22 414/140.9 |
| 6,132,156 | A | * | 10/2000 | Shehata ............... B65G 67/606 414/140.9 |
| 7,814,855 | B2 | * | 10/2010 | Stapp ....................... E02B 3/20 114/230.15 |
| 9,193,571 | B2 | * | 11/2015 | Koch ...................... B66C 23/82 |
| 2002/0023891 | A1 | | 2/2002 | Verchere et al. |

FOREIGN PATENT DOCUMENTS

| | | |
|---|---|---|
| CN | 204265034 U | 4/2015 |
| CN | 104847112 A | 8/2015 |
| CN | 104875852 A | 9/2015 |
| CN | 104876135 A | 9/2015 |
| CN | 106044260 A | 10/2016 |
| CN | 106219258 A | 12/2016 |
| CN | 205802503 U | 12/2016 |
| CN | 205973028 U | 2/2017 |
| CN | 106477341 A | 3/2017 |
| CN | 106743280 A | 5/2017 |
| CN | 107628555 A | 1/2018 |
| CN | 107720572 A | 2/2018 |
| CN | 207699078 U | 8/2018 |
| DE | 4315323 A1 | 11/1994 |
| GB | 111064 A | 11/1917 |
| JP | 2010285233 A | 12/2010 |

\* cited by examiner

LARGE-SPAN BULK MATERIAL CONVEYING SYSTEM

CROSS-REFERENCE TO RELATED APPLICATIONS

This application is a continuation of International Patent Application No. PCT/CN2019/119316, filed on Nov. 19, 2019, which claims the benefit of priority from Chinese Patent Application No. 201910984451.6, filed on Oct. 16, 2019. The content of the aforementioned applications, including any intervening amendments thereto, is incorporated herein by reference in its entirety.

TECHNICAL FIELD

The present invention relates to a large-span bulk material conveying system, and belongs to the field of conveyors.

BACKGROUND OF THE PRESENT INVENTION

At present, with the rapid development of the economy and society, the demands for sand and gravel are also increasing. How to convey and pile up the sand and gravel in all directions is a problem to be urgently solved. In the prior art, a sand carrier is used. The sand is conveyed by the sand carrier to a dike, and then the sand and gravel are conveyed by a conveying device beside the dike to a stockyard and then piled up. In the large-scale stockyard, a belt-type conveyor is a preferred conveying device. The conveyor can only convey the sand and gravel to places along a conveying belt. Therefore, the existing large-scale stockyard still has the problems of low land utilization rate and low working efficiency of the conveyor. The traditional solution is to use other devices to transfer the sand and gravel, which may inevitably increase the cost and management difficulty.

During the use of the conveyor, there are actually the following problems:

1. In the prior art, a folding conveying arm is used to realize functions of long-distance conveying and storage. However, the folding arm is generally folded in two sections. The folding of three sections is generally assisted by various devices such as a hydraulic cylinder. The complete unfolding cannot be realized only by the hydraulic cylinder, and requires other auxiliary structures.

2. The conveyor in the prior art is single in a balancing form and cannot realize multilevel variable balancing. Especially for a large-sized device, the multilevel variable balancing is more difficult to realize.

3. In the prior art, generally the travel control only adopts one limit part such as a bump, an anti-collision block and the like. However, the limit part is single in structure and cannot realize dynamic travel control. Particularly in the conveyor, the folding and unfolding states of the folding arm are caused by the movement of the large-sized device, so that the dynamic travel control is particularly important, which is not solved in the prior art.

4. In the prior art, after the conveying belt and the hopper has conveyed materials, there may be some materials remaining thereon, so that at the moment, it is not appropriate to start the entire system. The prior art lacks of a flexible solution.

5. In the prior art, there is no stable connection and functional connection between an upstream conveyor and a downstream conveyor, resulting in resource waste and low efficiency.

6. Taking Changsha section of Xiangjiang River as an example, the flood season is from April to September every year, with the highest water level reaching 39.21 m, and the dry season is from October to March of the following year, with the lowest water level reaching 25.15 m. At present, a sand unloading ship of a sand and gravel factory can unload the sand normally in the high water season, but cannot unload the sand in the low flow season. Therefore, it is necessary to design a dike-striding elevation-type feeding apparatus to deliver the sand and gravel to the stockyard.

7. In the prior art, the hopper generally adopts a large-area support, that is, the support is generally a whole panel, so that the support has sufficient strength to support a valve plate below the hopper. There is occasionally a supporting-leg support, and the valve plate is fixed on supporting legs, which leads to large area of the valve plate, thereby increasing the weight and the moving range.

8. In the prior art, the stress on a lower guide rail of overlapping guide rails is a major problem. Especially in the dike-striding elevation-type feeding conveying device, a first telescopic conveyor is located on a second telescopic conveyor, and the stress on the second telescopic conveyor is always a trouble. Generally, for safety, the telescopic conveyor with large volume and solid structure is used.

9. In the prior art, an inclined moving apparatus such as an elevation feeding trolley in the dike-striding elevation-type feeding conveying device generally has a solid structure, which consumes a large number of materials.

SUMMARY OF THE PRESENT INVENTION

To overcome the above problems, the present invention specifically provides a solution of a folding arm conveyor that rotates horizontally.

The technical solution adopted by the present invention to solve the technical problems is as follows: a large-span bulk material conveying system includes a folding arm conveyor and a dike-striding elevation-type conveying device. The folding arm conveyor includes three sections of conveying arms, a tower top (10), a balance arm (17), a tower body (24), an undercarriage (25), a windlass, wire ropes, portal frames and a limit apparatus. The undercarriage (25) is fixedly mounted in a stockyard through foundation bolts, and the tower body (24) is also connected with the undercarriage (25) through bolts.

The three sections of conveying arms are respectively a first conveying arm (7), a second conveying arm (4) and a third conveying arm (1). The first conveying arm (7) is mounted on the tower body (24) through a pin shaft. The second conveying arm (4) is connected to the first conveying arm (7) through a pin shaft. The third conveying arm (1) is connected to the second conveying arm through a pin shaft. The third conveying arm (1) is a trapezoidal structure, and the conveying arm is provided with an unloading trolley (9). The portal frame I (5) is mounted on one end (4) of the first conveying arm (7) close to the second conveying arm (4), and the limit apparatus I (6) is also mounted on the first conveying arm. The portal frame II (2) is mounted on one end of the third conveying arm (1) close to the second conveying arm (4), and the limit apparatus II (3) is also mounted on the third conveying arm.

The balance arm (17) is mounted on the tower body (24) through a pin shaft; the tower top (10) is connected to the tower body (24) through bolts; and the windlass includes a windlass I (21), a windlass II (20), a windlass III (19) and a windlass IV (18), which are successively mounted on the balance arm (17).

A wire rope I (11) controlled by the windlass I (21) successively bypasses a pulley block on a top end of the tower top, a pulley block on a top end of the portal frame I (5) and a pulley block on a lower portion of the second conveying arm (4); a wire rope II (12) controlled by the windlass II (20) bypasses the pulley block mounted on the tower top (10) and finally bypasses a pulley block located on an upper portion of the second conveying arm (4); a wire rope III (13) controlled by the windlass III (19) successively bypasses the pulley block located on the tower top (10), the pulley block on a top end of the portal frame II (2) and a pulley block on a side portion of the third conveying arm (1); and the tower body (24) is provided with a gyration apparatus (23) and a hopper (22).

Distances from the pulley block on the lower portion of the second conveying arm to two ends of the second conveying arm are respectively a first distance and a second distance, and the first distance is twice the second distance; and distances from the pulley block on the side portion of the third conveying arm to two ends of the third conveying arm are respectively a third distance and a fourth distance, the third distance is twice the fourth distance, and the pulley block on the upper portion of the second conveying arm and the pulley block on the lower portion of the second conveying arm are arranged side by side.

The dike-striding elevation-type conveying device includes a rail system (101), an elevation feeding trolley (102), a feeding hopper system (103), a telescopic conveyor (104), a windlass (105), an amplitude changing conveyor (107) and a fixed conveyor (109); and the rail system (101) includes a buffering spring (101.1) and a guide rail (101.2), and the buffering spring (101.1) is located right below the guide rail (101.2).

The elevation feeding trolley (102) includes supporting rods (102.1), clamp-type brakes (102.2), a lower bottom plate (102.3), a lifting hook (102.4), an upper supporting plate (102.5) and a water level sensor (102.6); and the clamp-type brakes (102.2) are mounted at two sides of the elevation feeding trolley (102), and the lifting hook (102.4) is mounted in front of the elevation feeding trolley (102).

The feeding hopper system (3) includes a feeding hopper (103.1), a hopper door (103.2), a vibrating stick (103.3), suspension rods (103.4), ribs (103.5), level rods (103.6), valve rails (103.7), a valve plate (103.8), supporting legs (103.9) and oblique rods (103.10). The vibrating stick (103.3) is mounted inside the feeding hopper (103.1). An opening is arranged below the feeding hopper, and the valve plate can movably open and close the opening. Four corners of the feeding hopper are provided with the four supporting legs. The inner side of each supporting leg is connected with the rib. The four ribs extend upwardly, and the extension end of each rib is connected with the level rod. The four level rods form a square and are connected to the bottom surface of the feeding hopper. The lower end of one level rod is connected with three suspension rods. Lower ends of the three suspension rods are connected with the valve rails. The valve plate is mounted on the valve rails, and the valve plate can move along the valve rails so as to open and close the opening. Two oblique rods are connected between two supporting legs at one side of the suspension rod so as to strengthen the supporting for the suspension rods and the valve plate, and the other three sides are not provided with the oblique rod. The four supporting legs are connected to four corners of the upper supporting plate (102.5).

Preferably, the balance arm (17) and the conveying arm are respectively mounted at two sides of the tower body (24), and the mounting position of the balance arm (17) is higher than the mounting position of the conveying arm. The balance arm (17) and the conveying arm are connected with a crossbeam located at the top end of the tower top through a balance arm pull rod (14) and a conveying arm pull rod (8).

Preferably, one end of the first conveying arm (7) close to the tower body (24) is provided with a driving roller, and the tail end of the third conveying arm (1) is provided with a driven roller. The first conveying arm (7), the second conveying arm (4) and the third conveying arm (1) are respectively provided with a grooved carrier roller group, a return carrier roller and a pinch roller. The pinch roller is used to prevent a conveying belt from leaving the carrier roller during the folding and unfolding of the conveying arm, and the unloading trolley (9) can move along the conveying arm.

Preferably, the tower top (10) is successively provided with three groups of pulley blocks from bottom to top, which are respectively used for the wire rope I (11), the wire rope II (12) and the wire rope III (13) to bypass.

Preferably, the tower body (24) is provided with the gyration apparatus (23). The gyration apparatus can drive the conveying arm and the balance arm (17) to rotate within a horizontal plane. The hopper (22) can incline relative to the tower body so as to be convenient to wash. The movement of the gyration apparatus (23) and the unloading trolley (9) is controlled by a programmable control system.

Preferably, the first distance is a distance from the pulley block on the lower portion of the second conveying arm to one end of the second conveying arm close to the tower body in an unfolded state.

Preferably, the balance arm (17) is provided with a balance trolley (16) and travel switches. The balance trolley is connected with the windlass IV through a wire rope IV, and the movement of the balance trolley is controlled by the windlass IV (18) which is automatically controlled based on PLC programming. When the conveying arms are in a folded state, an unfolded no-load state, an unfolded medium-load state and an unfolded heavy-load state, the balance trolley moves to the corresponding four positions on the balance arm, and the purpose for the trolley to move to different positions is to balance a tilting torque of the conveying arm in different states. The travel switch is mounted on each position, and the travel switches are respectively named as the travel switch I, the travel switch II, the travel switch III and the travel switch IV from the near to the distant. The lower end of the balance arm (17) is provided with a hook for connecting the fixed conveyor (109) and using the weight of the fixed conveyor (109) as a balance weight.

Preferably, the telescopic conveyor (104) includes a first telescopic conveyor (104.1) and a second telescopic conveyor (104.5). The first telescopic conveyor (104.1) is located above the second telescopic conveyor (104.5). The first telescopic conveyor (104.1) is connected to the middle of the upper supporting plate (102.5) through an arm support connector (102.7). One end of the first telescopic conveyor (104.1) is provided with an angle sensor (104.4) and a striker plate (104.7). A swinging angle of the second telescopic conveyor (104.5) is driven by a leveling oil cylinder (106.1). An arm support trundle (104.3) is arranged below the first telescopic conveyor (104.1), and guide rails (104.6) are arranged above the second telescopic conveyor (104.5). The arm support trundle moves on the guide rail. The guide rail of the second telescopic conveyor (104.5) is supported by vertical beams (104.10). An oblique beam (104.9) is connected between the two vertical beams. Supporting beams (104.8) are arranged between planes where the two guide rails are located. An upper crossbeam (104.12) is arranged below the two guide rails. A lower crossbeam (104.11) is arranged below the upper crossbeam. The left side and right side of a junction between the oblique beam and the upper crossbeam are respectively provided with one supporting beam. The junction between the vertical beam and the lower crossbeam is provided with one supporting beam.

Preferably, the windlass (105) is connected with the lifting hook (102.4) through the pulley block. A pitching angle of the amplitude changing conveyor (107) is changed by the hydraulic oil cylinder (106.2). The fixed conveyor (109) is connected with the amplitude changing conveyor (107) through the connector (108). A supporting stand column (110) is mounted below the fixed conveyor (109). The tail end of the fixed conveyor (109) is provided with a hanging rod. The hanging rod (119) can rotate by 90 degrees relative to the fixed conveyor (109). The hanging rod can be fixed on the hook in a lap joint manner.

Compared with the prior art, the present invention has the following beneficial effects:

1. For the first problem in the background, on the basis that the three sections of conveying arms are respectively provided with the wire ropes, a solution of multi-point forward-backward traction is used, so that the folding of three sections is realized only by the wire ropes. The multi-point forward-backward traction includes points on the portal frames, a point on the lower pulley block, a point on the upper pulley block and a point on the side pulley block. In the multi-point traction, the folding and unfolding of the three sections can be realized by the forward traction and backward traction of the multi-point traction, so that the use of the hydraulic cylinder and a complicated cooperation structure can be avoided, thereby greatly reducing the cost.

2. For the second problem in the background, the movable balance trolley is used. Different arm of forces and torques can be obtained by moving the balance trolley to different points, thereby realizing the dynamic balancing.

3. For the third problem in the background, the dynamic limit of the portal frames can be realized under the combined action of supporting blocks and sliding blocks, thereby playing a role in dynamically supporting and limiting the wire ropes connected with the portal frames and the conveying arms.

4. For the fourth problem in the background, when there are residual materials, the materials in the hopper can be received by an oblique plate on the unloading trolley, thereby obtaining the residual materials.

5. For the fifth problem in the background, the double-acting hanging rod is used. The double-acting hanging rod not only can be used as a level connector and a level lap joint part between the upstream device and the downstream device, but also can rotate by 90 degrees to be connected with the upper rotary conveying apparatus, so that the entire dike-striding elevation-type feeding conveying device is used as the balance weight. The lower end of the balance arm is provided with the hook which is used for connecting the upstream device and uses the weight of the upstream device as the balance weight.

6. For the sixth point in the background, the up-down movement of the elevation feeding trolley on a slope of the dike, the conveying of the overlapping telescopic rails, the variable-amplitude conveying and the fixed conveying are used to adapt to different water level working conditions in the dry season and the high water season and adapt to the long-distance and short-distance conveying, so that the adaptability is wider, and the conveying distance is longer.

7. For the seventh point in the background, the strengthening ribs are arranged on the supporting legs, and a square hoop (the level rods) arranged above the strengthening ribs is used as a suspension part, so that the structural strength of a valve plate assembly is guaranteed. At the same time, the single-side suspension structure is arranged below the hopper, so that the conveying distance of the valve plate is not too long, and the area of the valve plate does not need to be enlarged for fixed connection.

8. For the eighth point in the background, a stress structure of the second telescopic conveyor is detailed. Through the layout of the supporting beams, the oblique beams and the vertical beams, the material is maximally saved on the basis of guaranteeing the strength.

9. For the ninth point in the background, the combined supporting rod is arranged between the upper supporting plate and the lower bottom plate, so that the supporting strength is maximally guaranteed, and the material is saved.

DESCRIPTION OF NUMERALS IN THE DRAWINGS

Description of reference numerals: 1—third conveying arm; 2—portal frame II; 3—limit apparatus II; 4—second conveying arm; 5—portal frame I; 6—limit apparatus I; 7—first conveying arm; 8—conveying arm pull rod; 9—unloading trolley; 10—tower top; 11—wire rope I; 12—wire rope II; 13—wire rope III; 14—balance arm pull rod; 15—wire rope IV; 16—balance trolley; 17—balance arm; 18—windlass IV; 19—windlass III; 20—windlass II;

21—windlass I; 22—hopper; 23—gyration apparatus; 24—tower body; 25—undercarriage; 26—sand unloading ship; 27—elevation feeding apparatus; 28—dike-striding amplitude changing apparatus; 29—horizontal rotary central folding arm conveyor; 30—stockyard; 31—dike; 32—separation plate; 33-lower cavity; 34—supporting block; 35—sliding block; 36—framework; 37—upper cavity; 101—rail system; 101.1—buffering spring; 101.2—guide rail; 102—elevation feeding trolley; 102.1—supporting rod; 102.2—clamp-type brake; 102.3-lower bottom plate; 102.4—lifting hook; 102.5—upper supporting plate; 102.6—water level sensor; 103—feeding hopper system; 103.1—feeding hopper; 103.2—hopper door; 103.3—vibrating stick; 103.4—suspension rod; 103.5—rib; 103.6—level rod; 103.7—valve rail; 103.8—valve plate; 103.9—supporting leg; 103.10—oblique rod; 104—telescopic conveyor; 104.1—first telescopic conveyor; 104.2—arm support trundle supporting frame; 104.3—arm support trundle; 104.4—angle sensor; 104.5—second telescopic conveyor; 104.6—guide rail; 104.7—striker plate; 104.8—supporting beam; 104.9—oblique beam; 104.10—vertical beam; 104.11—lower crossbeam; 104.12—upper crossbeam; 105—windlass; 106—hydraulic oil cylinder system; 106.1—leveling oil cylinder; 106.2—hydraulic oil cylinder; 106.3—hydraulic oil cylinder bearing; 107—amplitude changing conveyor; 107.1—distance sensor; 108—connecting plate; 109—fixed conveyor; 110—stand column; 111—slope; 112—support; 119—hanging rod.

DETAILED DESCRIPTION OF THE PRESENT INVENTION

The present invention is further described below in conjunction with the drawings and embodiments.

As shown in the drawings, a large-span bulk material conveying system includes a folding arm conveyor and a dike-striding elevation-type feeding conveying device. The folding arm conveyor includes three sections of conveying arms, a tower top 10, a balance arm 17, a tower body 24 and an undercarriage 25. The folding arm conveyor also includes a windlass, wire ropes, portal frames and a limit apparatus. The undercarriage 25 is fixedly mounted in a stockyard through foundation bolts. The tower body 24 is also connected with the undercarriage 25 through bolts. The three sections of conveying arms are respectively a first conveying arm 7, a second conveying arm 4 and a third conveying arm 1. The first conveying arm 7 is mounted on the tower body 24 through a pin shaft. The second conveying arm 4 is connected to the first conveying arm 7 through a pin shaft. The third conveying arm 1 is connected to the second conveying arm 4 through a pin shaft. The third conveying arm 1 is a trapezoid structure. The conveying arms are provided with an unloading trolley 9. The portal frame I 5 is mounted on one end of the first conveying arm 7 close to the second conveying arm 4. The limit apparatus I 6 is also mounted on the first conveying arm. The portal frame II 2 is mounted on one end of the third conveying arm 1 close to the second conveying arm 4. The limit apparatus II 3 is also mounted on the third conveying arm. The balance arm 17 is mounted on the tower body 24 through a pin shaft. The tower top 10 is connected to the tower body 24 through bolts. The windlass includes a windlass I 21, a windlass II 20, a windlass III 19 and a windlass IV 18, which are successively mounted on the balance arm 17. A wire rope I 11 controlled by the windlass I 21 successively bypasses a pulley block on a top end of the tower top, a pulley block on a top end of the portal frame I 5 and a pulley block on a lower portion of the second conveying arm 4. A wire rope II 12 controlled by the windlass II 20 bypasses the pulley block mounted at the tower top 10 and finally bypasses a pulley block located on an upper portion of the second conveying arm 4. A wire rope III 13 controlled by the windlass III 19 successively bypasses the pulley block located on the tower top 10, the pulley block on the top end of the portal frame II 2 and a pulley block on a side portion of the third conveying arm 1. The tower body is also provided with a gyration apparatus 23 and a hopper 22.

As shown in the drawings, specific unfolding steps of an arm support are as follows: a, the arm support is unfolded; the windlass I 21 is started; under the pulling force of the wire rope I 11, the second conveying arm 4 and the third conveying arm I may rotate upwards; at the same time, the windlass IV is started, and a balance trolley 16 moves in a direction away from the tower body 24; when the second conveying arm 4 forms an angle of 90 degrees with a horizontal plane, the windlass II 20 is started, the wire rope I 11 is released, and two sections of conveying arms slowly rotate downwards under the pulling force of the wire rope II 12; after the second conveying arm 4 rotates downwards for a certain angle, the windlass III 19 is started and the third conveying arm 1 rotates upwards under the traction of the wire rope III 19; when the second conveying arm 4, the third conveying arm 1 and the first conveying arm 7 are located on the same plane, and a front wheel of the balance trolley touches a travel switch II, the balance trolley stops moving, and the conveying arm is completely unfolded; and b, the arm support is retracted by reversing the unfolding operation process of the arm support according to the same principle.

Figure 1:
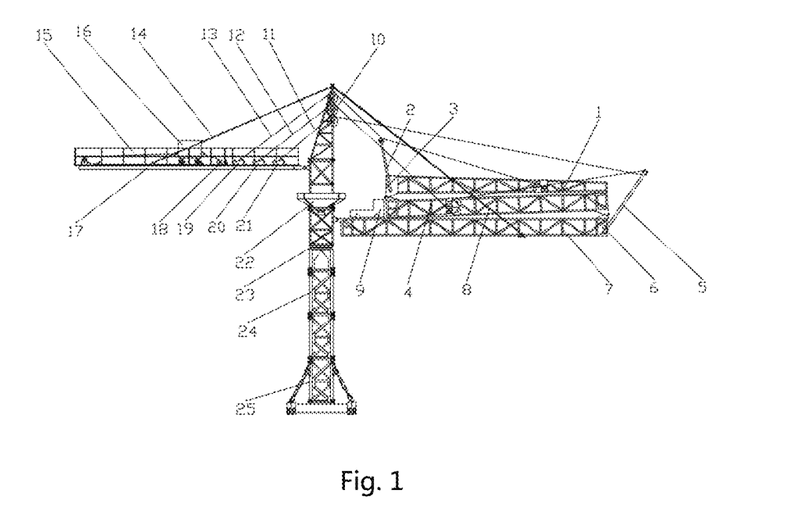
FIG. 1 is a schematic diagram of a conveying arm in a folded state.
Figure 2:
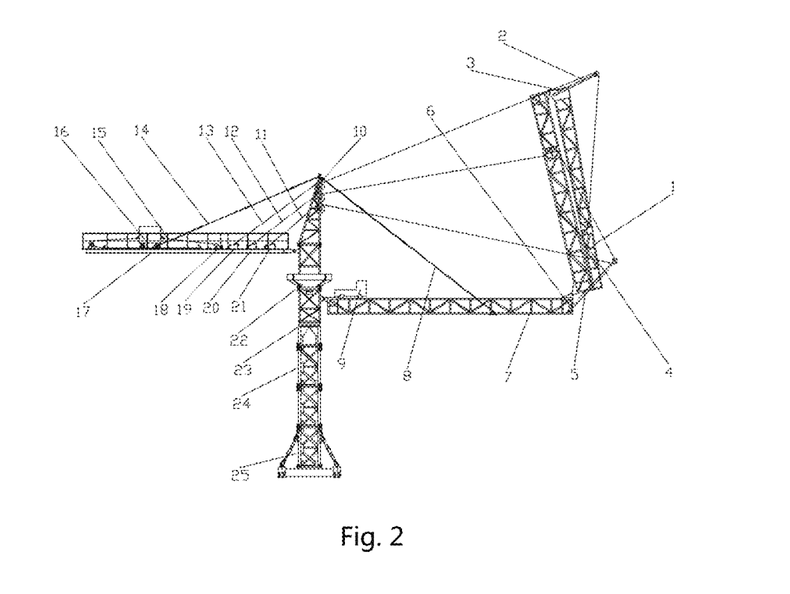
FIG. 2 is a schematic diagram of a portal frame I that pulls up a second conveying arm and a third conveying arm to a vertical state.
Figure 3:
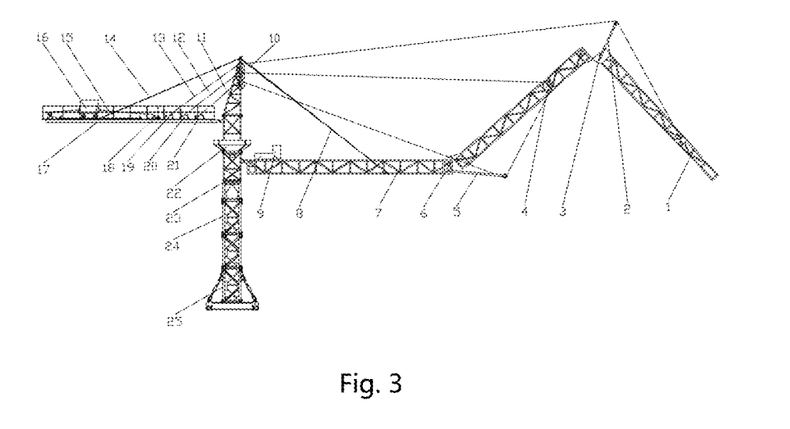
FIG. 3 is a schematic diagram of the second conveying arm and the third conveying arm unfolded under gravity and a pulling force of wire ropes.
Figure 4:
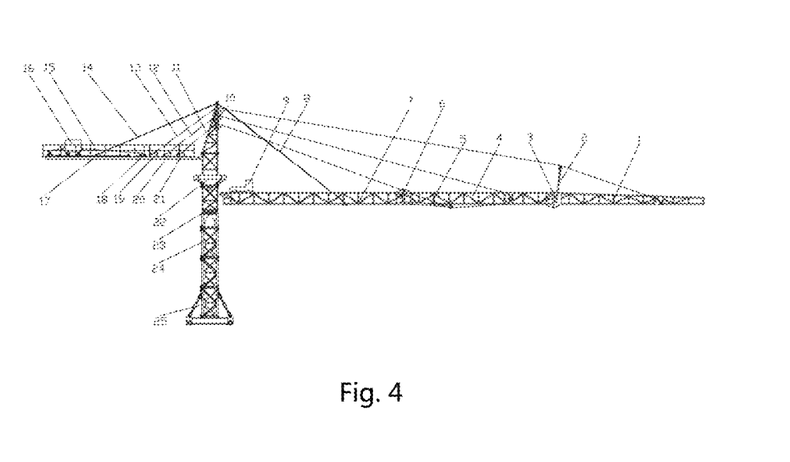
FIG. 4 is a schematic diagram of the conveying arm which is completely unfolded.
Figure 5:
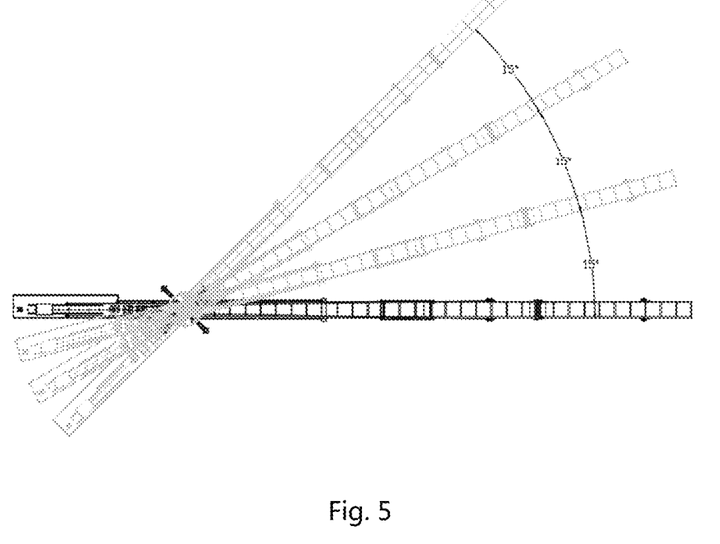
FIG. 5 is a schematic diagram of a conveyor rotating within a horizontal plane.

As shown in the drawings, after a motor for driving the gyration apparatus is started, the gyration apparatus may drive the tower top, the conveying arms and the balance arm to rotate.

Figure 6:
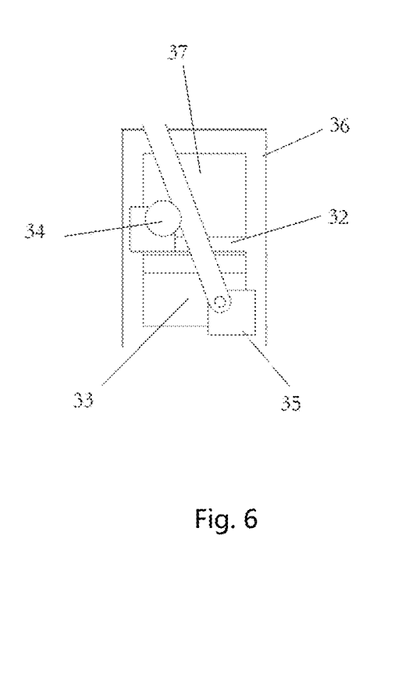
FIG. 6 is a schematic diagram of a limit apparatus when limiting the position of the portal frame.

As shown in the drawings, the portal frame does not rotate continuously after reaching the limit apparatus. The position of the conveying arm that is h1/tan γ away from the tower body is marked as a position A, and the tail end of the conveying arm is marked as a position B. The movement of the unloading trolley leaving the tower body is marked as the forward movement of the trolley. The movement of the unloading trolley approaching the tower body is marked as the backward movement of the trolley, and n represents the times of rotating by 15°. The gyration apparatus and the unloading trolley are automatically controlled after the programming. If a driving roller is stopped midway, the gyration apparatus and the unloading trolley are automatically returned.

Figure 7:
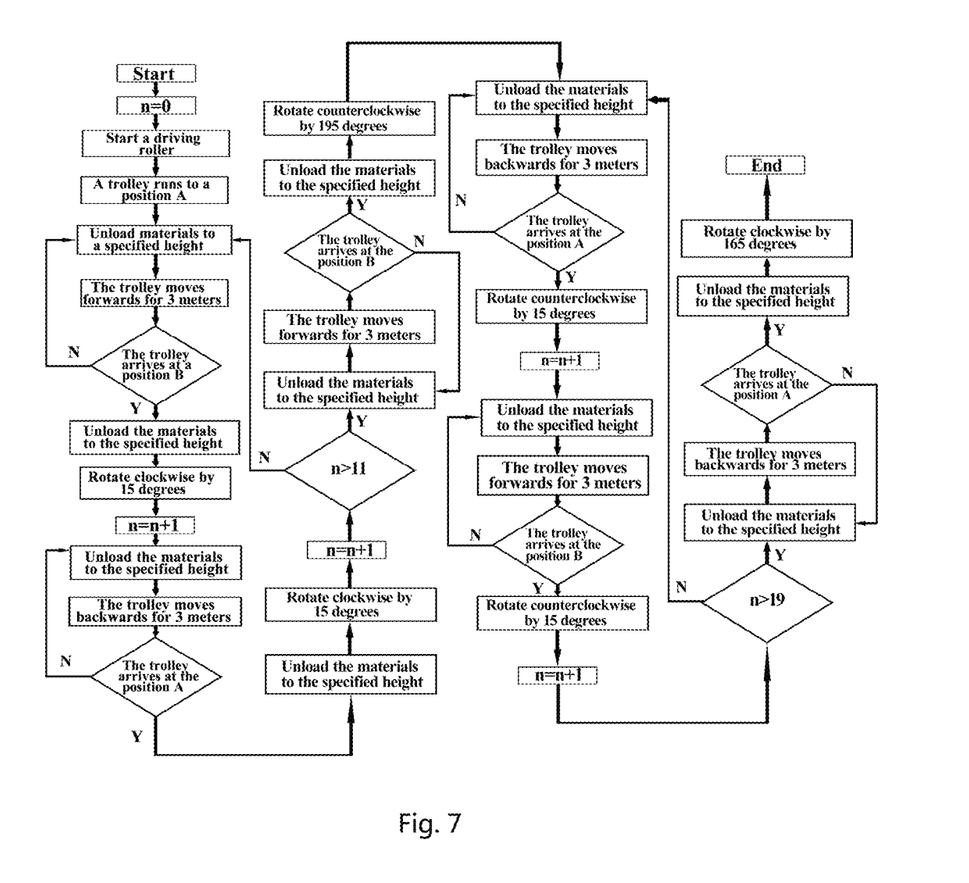
FIG. 7 is a flow chart of a process for automatically controlling the conveyor in a stockyard.

The movement of the gyration apparatus and the unloading trolley 9 is controlled by a programmable control system. Assuming that a stacking angle of sand and gravel is γ, a height of the conveying arm from the ground is h, and an allowable stacking height of the sand and gravel is h1, and requiring that the sand and gravel cannot bury the undercarriage during the stacking and unloading, then a distance from an unloading position of the unloading trolley 9 to the tower body shall not be less than h1/tan γ. The travel switches are respectively mounted on the position of the conveying arm that is h1/tan γ away from the tower body and on the tail end of the conveying arm. The bottom of the unloading trolley is provided with a position sensor. An automatic movement process of the gyration apparatus and the unloading trolley is as follows: a, after the conveying arm is unfolded, and after the driving roller is started, the unloading trolley automatically runs to the position that is h1/tan γ away from the tower body for unloading; b, when a position sensor mounted on the bottom of the unloading trolley detects that a distance between sand and gravel right below the unloading trolley and the unloading trolley is h-h1, the unloading trolley automatically runs for 3 meters along the conveying arm in a direction away from the tower body, and then the process b is repeated until the trolley runs to the tail end of the conveying arm and touches the travel switch; c, when the trolley runs to the tail end of the conveying arm and touches the travel switch, the trolley unloads the material again to a specified height, then the gyration apparatus automatically rotates clockwise by 15°, and the unloading trolley continues the unloading; d, when the position sensor detects that the distance between the sand and gravel right below the unloading trolley and the unloading trolley is h-h1 again, the unloading trolley 9 automatically runs for 3 meters along the conveying arm towards the tower body, and the process d is repeated until the trolley touches the travel switch again; e, when the unloading trolley 9 runs to the position that is h1/tan γ away from the tower body and touches the travel switch on the position, the trolley unloads the material again to the specified height and then the gyration apparatus automatically rotates clockwise by 15°; the processes a-e are repeated until the conveyor rotates clockwise by 180°; f, after the conveyor rotates clockwise by 180° and the unloading is ended, the conveyor automatically rotates counterclockwise by 195°; g, when the position sensor mounted on the bottom of the unloading trolley detects that the distance between the sand and gravel right below the unloading trolley and the unloading trolley is h-h1, the unloading trolley automatically runs for 3 meters along the conveying arm towards the tower body, and then the process g is repeated until the unloading trolley touches the travel switch again; h, when the unloading trolley runs to the position that is h1/tan γ away from the tower body and touches the travel switch on the position, the unloading trolley unloads the material to the specified height, and then the conveyor automatically rotates counterclockwise by 15°; i, when the position sensor detects that the distance between the sand and gravel right below the unloading trolley and the unloading trolley is h-h1 again, the unloading trolley automatically runs for 3 meters along the conveying arm in a direction away from the tower body, and then the process i is repeated until the trolley touches the travel switch again; j, when the trolley runs to the tail end of the conveying arm and touches the travel switch, the gyration apparatus automatically rotates counterclockwise by 15° and then the unloading trolley continues the unloading; and the processes g-j are repeated until the conveyor rotates counterclockwise by 165° and the unloading is completed; k, after the conveyor rotates counterclockwise by 165°, the conveyor automatically rotates clockwise by 165° to return to an initial position; and l, if the driving roller is stopped midway, the unloading trolley is automatically returned, and the gyration apparatus is also automatically returned.

Figure 8:
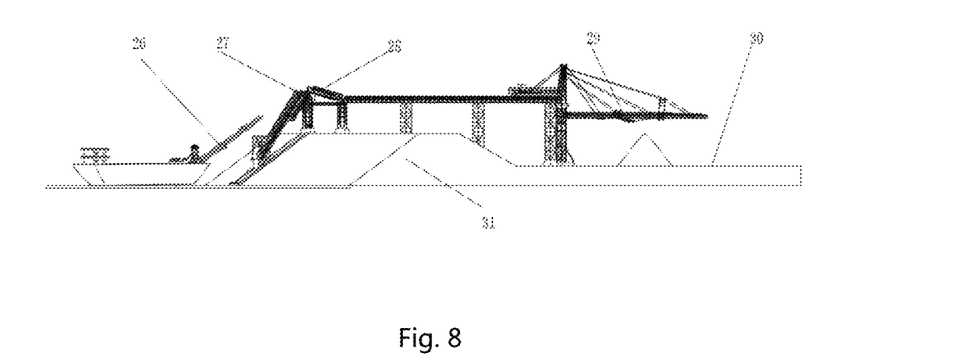
FIG. 8 is a schematic diagram of the present invention in a dike-striding conveying and stacking system, wherein the present invention is located at the tail end of the stacking system.

As shown in the drawings, the conveyor is mounted at the tail end of the conveying system, and the materials conveyed by the front conveyor are piled up in the stockyard.

Figure 9:
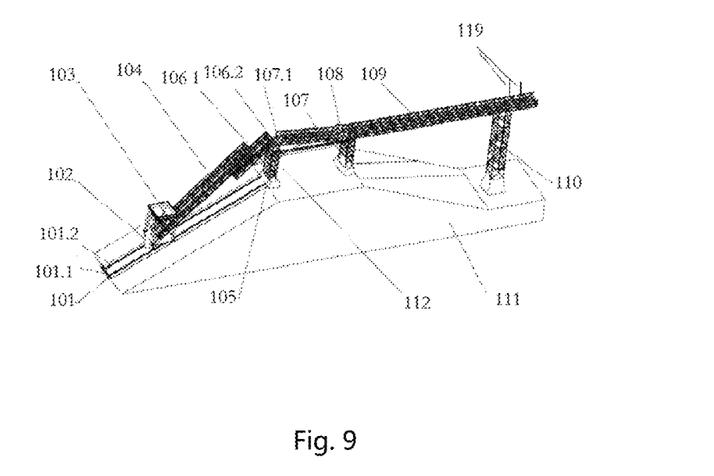
FIG. 9 is an overall structural schematic diagram of a dike-striding elevation-type conveying device.

As shown in the drawings, the dike-striding elevation-type conveying device includes a rail system 101, an elevation feeding trolley 102, a feeding hopper system 103, a telescopic conveyor 104, a windlass 105, an amplitude changing conveyor 107 and a fixed conveyor 109. The rail system 101 includes a buffering spring 101.1 and guide rails 101.2, and the buffering spring 101.1 is located right below the guide rails 101.2. The elevation feeding trolley 102 includes supporting rods 102.1, clamp-type brakes 102.2, a lower bottom plate 102.3, a lifting hook 102.4, an upper supporting plate 102.5 and a water level sensor 102.6. The clamp-type brakes 102.2 are mounted at two sides of the elevation feeding trolley 102. The lifting hook 102.4 is mounted in front of the elevation feeding trolley 102. The tail end of the elevation feeding trolley 102 is provided with the water level sensor 102.6. The feeding hopper system 103 includes a feeding hopper 103.1, a hopper door 103.2 and a vibrating stick 103.3. The hopper door 103.2 is disposed right below a material outlet of the feeding hopper 103.1, and the vibrating stick 103.3 is disposed above the feeding hopper 103.1. The telescopic conveyor 104 includes a first telescopic conveyor 104.1 and a second telescopic conveyor 104.5. The first telescopic conveyor 104.1 is located above the second telescopic conveyor 104.5. The first telescopic conveyor 104.1 is connected with the elevation feeding trolley 102 through an arm support connector 102.7. The front end of the second telescopic conveyor 104.1 is provided with the angle sensor 104.4. The swinging angle of the second telescopic conveyor 104.5 is driven by a leveling oil cylinder 106.1. The windlass 105 is connected with the lifting hook 102.4 through a pulley block. The support 112 is provided with a hydraulic oil cylinder bearing 106.3. A pitching angle of the amplitude changing conveyor 107 is changed by the hydraulic oil cylinder 106.2. The fixed conveyor 109 is connected with the amplitude changing conveyor 107 through a connector 108. A supporting stand column 110 is mounted below the fixed conveyor 109.

Figure 10:
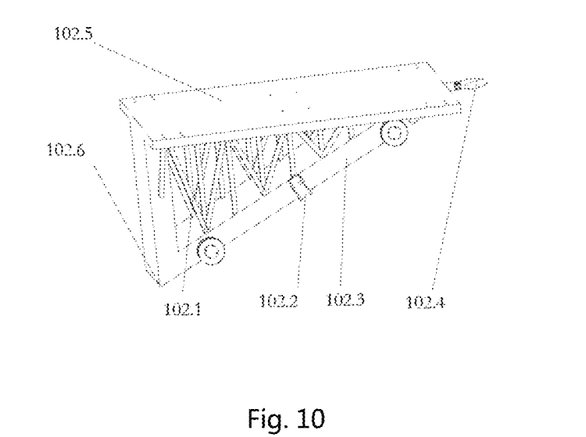
FIG. 10 is an overall structural schematic diagram of a feeding trolley.

An angle between the lower bottom plate 102.3 and the upper supporting plate 102.4 of the elevation feeding trolley 102 is equal to a slope gradient of the dike, so that the hopper can be ensured to be always located on the horizontal plane, and the feeding stability is guaranteed.

Supporting rods 102.1 are welded at two sides of the upper supporting plate 102.4 of the elevation trolley. The supporting rods 102.1 can guarantee the strength of the upper supporting plate 102.4 and prevent the bending of the upper supporting plate 102.4.

Figure 11:
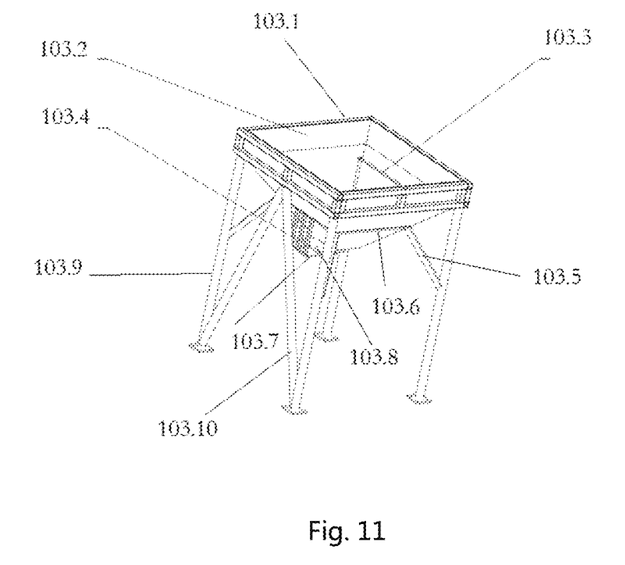
FIG. 11 is a schematic diagram of a feeding hopper of the present invention.

The vibrating stick 103.3 is mounted inside the feeding hopper 103. In the circumstances that the viscosity of the sand and gravel is high and the unloading is slow, the vibrating stick 103.3 is started to accelerate the unloading.

Figure 12:
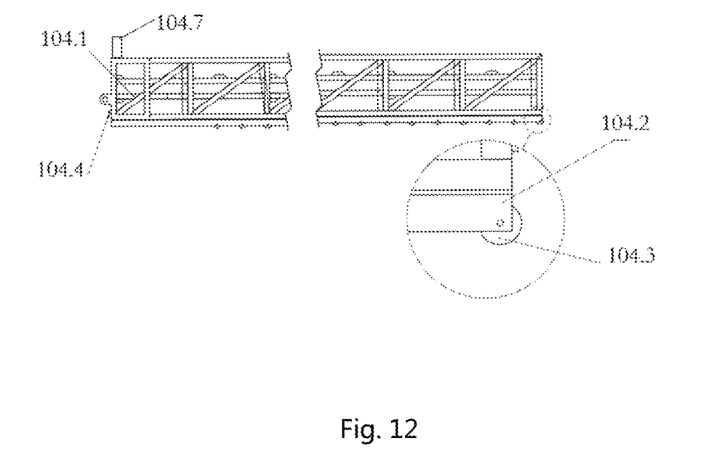
FIG. 12 is a schematic diagram of a first telescopic conveyor of the present invention.

An arm support trundle supporting frame 104.2 is mounted below the first telescopic conveyor 104.1. An arm support trundle 104.3 is mounted below the arm support trundle supporting frame 104.2. The first telescopic conveyor 104.1 can slide along the second telescopic conveyor 104.5.

Figure 13:
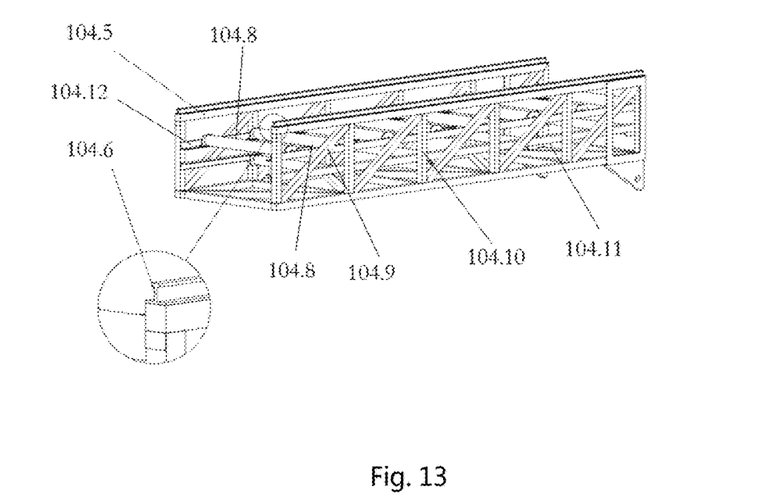
FIG. 13 is a schematic diagram of a second telescopic conveyor of the present invention.

A guide rail 104.6 is mounted above the second telescopic conveyor 104.5. The first telescopic conveyor 104.1 can slide along the guide rail 104.6.

A hanging end of the amplitude changing conveyor 107 is provided with a distance sensor 107.1 which is used to detect a vertical distance between the hanging end of the amplitude changing conveyor 107 and the first telescopic conveyor. The distance sensor 107.1 feeds back the distance to a control system. The control system controls the hydraulic oil cylinder 106.2 so as to change a pitching angle of the amplitude changing conveyor and to prevent the interference between the first telescopic conveyor and the amplitude changing conveyor 107. At the same time, a drop height between the first telescopic conveyor and the amplitude changing conveyor 107 can also be controlled within a reasonable range, thereby accurately conveying the sand and gravel.

Figure 14:
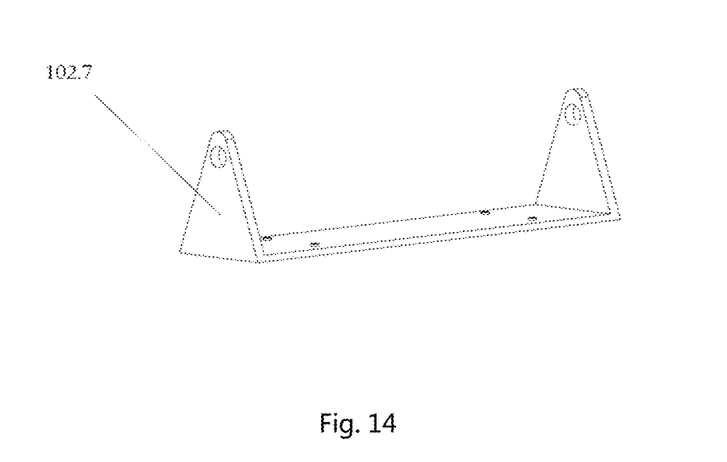
FIG. 14 is a schematic diagram of a telescopic conveyor connector of the present invention.

Tow connectors 108 are hinged together, so that the amplitude changing conveyor 107 and the fixed conveyor 109 are connected together, and the amplitude changing conveyor 107 can rotate around a hinge point.

Figure 15:
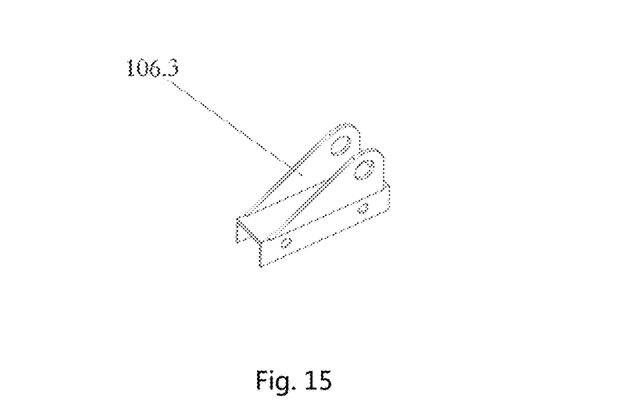
FIG. 15 is a schematic diagram of a hydraulic oil cylinder bearing 6.3 of the present invention.
Figure 16:
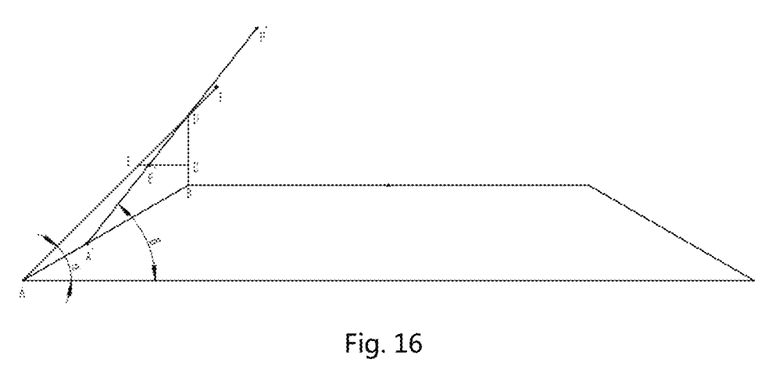
FIG. 16 is a schematic diagram of travel function deduction of a leveling oil cylinder 6.1 of the present invention.

As shown in the drawings, AF represents a length of the first telescopic conveyor; point A represents a start point of the telescopic conveyor; A' represents that after time Δt, the conveyor moves from point A to A'; an angle between the first telescopic conveyor at the start point A and the horizontal plane is α (known quantity), and an angle between the first telescopic conveyor at point A' and the horizontal plane is x; EC represents an initial length of the leveling oil cylinder 106.1; EC represents a length of the extended leveling oil cylinder 106.1; D represents a hinge point of the second telescopic point; CD represents a length from the hydraulic oil cylinder bearing 106.3 to the hinge point of the second telescopic conveyor, marked as h (known quantity); therefore, it can be obtained that the travel distance of the leveling oil cylinder 106.1 satisfies a function as follows:

$$f(x) = \frac{h}{\tan\alpha} - \frac{h}{\tan x}$$

As shown in the drawings, a working principle of the device is as follows: after the sand unloading ship sends the sand and gravel into the feeding hopper 103, the sand and gravel may first enter the telescopic belt-type conveyor 104 along the feeding hopper 103, passes through the telescopic belt-type conveyor 104 to enter the amplitude changing conveyor 107 and finally enters the fixed conveyor 108. In this process, the height of the water level may change at any time, but the water level sensor 102.6 first detects the change of the water level and feeds back the change to the control system. The control system starts the windlass 105, and the windlass 105 acts on the elevation feeding trolley 102 through the wire rope. The elevation feeding trolley 102 moves along the dike. Meanwhile, the first telescopic conveyor 104.1 is pushed by the elevation feeding trolley 102 to move along the second telescopic conveyor 104.5. At this time, the control system may control the hydraulic oil cylinder 106, and the hydraulic oil cylinder 106 pushes the second telescopic conveyor 104.5, so that the first telescopic conveyor 104.1 and the second telescopic conveyor 104.5 are always kept level with each other. When the first telescopic conveyor 104.1 is not beyond the second telescopic conveyor 104.4, then the sand and gravel fall into the second telescopic conveyor 104.5 from the first telescopic conveyor 104.1 and fall into the amplitude changing conveyor 107 from the second telescopic conveyor 104.5. Under this situation, the pitching angle of the amplitude changing conveyor 107 does not need to be changed. When the first telescopic conveyor 104.1 is beyond the second telescopic conveyor 104.5, then the sand and gravel may directly fall into the amplitude changing conveyor 107 from the first telescopic conveyor 104.1, and the pitching angle of the amplitude changing conveyor 107 is changed under the pushing effect of the hydraulic oil cylinder 106.2 so as to reduce the drop height of the sand and gravel, thereby accurately conveying the sand and gravel.

The above describes preferred contents of the present invention, and shall not be used to limit the scope of claims of the present invention. It should be pointed out that several variations, improvements and replacements may be made by those ordinary skilled in the art without departing from the concept of the present invention, and shall fall within the protection scope of the present invention. Therefore, the patent protection scope of the present invention shall depend on claims.

What is claimed is:

1. A large-span bulk material conveying system, comprising a folding arm conveyor and a dike-striding elevation-type conveying device, wherein the folding arm conveyor comprises three sections of conveying arms, a tower top (10), a balance arm (17), a tower body (24), an undercarriage (25), a windlass, wire ropes, portal frames and a limit apparatus; and the undercarriage (25) is fixedly mounted in a stockyard through foundation bolts, and the tower body (24) is also connected with the undercarriage (25) through bolts;

the three sections of conveying arms are respectively a first conveying arm (7), a second conveying arm (4) and a third conveying arm (1); the first conveying arm (7) is mounted on the tower body (24) through a pin shaft; the second conveying arm (4) is connected to the first conveying arm (7) through a pin shaft; the third conveying arm (1) is connected to the second conveying arm through a pin shaft; the third conveying arm (1) is a trapezoidal structure, and the conveying arm is provided with an unloading trolley (9); the portal frame I (5) is mounted on one end (4) of the first conveying arm (7) close to the second conveying arm (4), and the limit apparatus I (6) is also mounted on the first conveying arm; the portal frame II (2) is mounted on one end of the third conveying arm (1) close to the second conveying arm (4), and the limit apparatus II (3) is also mounted on the third conveying arm;

the balance arm (17) is mounted on the tower body (24) through a pin shaft; the tower top (10) is connected to the tower body (24) through bolts; and the windlass comprises a windlass I (21), a windlass II (20), a windlass III (19) and a windlass IV (18), which are successively mounted on the balance arm (17);

a wire rope I (11) controlled by the windlass I (21) successively bypasses a pulley block on a top end of the tower top, a pulley block on a top end of the portal frame I (5) and a pulley block on a lower portion of the second conveying arm (4); a wire rope II (12) controlled by the windlass II (20) bypasses the pulley block mounted on the tower top (10) and finally bypasses a pulley block located on an upper portion of the second conveying arm (4); a wire rope III (13) controlled by the windlass III (19) successively bypasses the pulley block located on the tower top (10), the pulley block on a top end of the portal frame II (2) and a pulley block on a side portion of the third conveying arm (1); and the tower body (24) is provided with a gyration apparatus (23) and a hopper (22);

distances from the pulley block on the lower portion of the second conveying arm to two ends of the second conveying arm are respectively a first distance and a second distance, and the first distance is twice the second distance; and distances from the pulley block on the side portion of the third conveying arm to two ends of the third conveying arm are respectively a third distance and a fourth distance, the third distance is twice the fourth distance, and the pulley block on the upper portion of the second conveying arm and the pulley block on the lower portion of the second conveying arm are arranged side by side;

the dike-striding elevation-type conveying device comprises a rail system (101), an elevation feeding trolley (102), a feeding hopper system (103), a telescopic conveyor (104), a windlass (105), an amplitude changing conveyor (107) and a fixed conveyor (109); and the rail system (101) comprises a buffering spring (101.1) and a guide rail (101.2), and the buffering spring (101.1) is located right below the guide rail (101.2);

the elevation feeding trolley (102) comprises supporting rods (102.1), clamp-type brakes (102.2), a lower bottom plate (102.3), a lifting hook (102.4), an upper supporting plate (102.5) and a water level sensor (102.6); and the clamp-type brakes (102.2) are mounted at two sides of the elevation feeding trolley (102), and the lifting hook (102.4) is mounted in front of the elevation feeding trolley (102);

the feeding hopper system (3) comprises a feeding hopper (103.1), a hopper door (103.2), a vibrating stick (103.3), suspension rods (103.4), ribs (103.5), level rods (103.6), valve rails (103.7), a valve plate (103.8), supporting legs (103.9) and oblique rods (103.10); the vibrating stick (103.3) is mounted inside the feeding hopper (103.1); an opening is arranged below the feeding hopper, the valve plate can movably open and close the opening; four corners of the feeding hopper are provided with the four supporting legs; the inner side of each supporting leg is connected with the rib; the four ribs extend upwardly, and the extension end of each rib is connected with the level rod; the four level rods form a square and are connected to the bottom surface of the feeding hopper; the lower end of one level rod is connected with three suspension rods; lower ends of the three suspension rods are connected with the valve rails; the valve plate is mounted on the valve rails, and the valve plate can move along the valve rails so as to open and close the opening; two oblique rods are connected between two supporting legs at one side of the suspension rod so as to strengthen the supporting for the suspension rods and the valve plate, and the other three sides are not provided with the oblique rod; and the four supporting legs are connected to four corners of the upper supporting plate (102.5).

2. The large-span bulk material conveying system according to claim 1, wherein the balance arm (17) and the conveying arm are respectively mounted at two sides of the tower body (24), and the mounting position of the balance arm (17) is higher than the mounting position of the conveying arm; and the balance arm (17) and the conveying arm are connected with a crossbeam located at the top end of the tower top through a balance arm pull rod (14) and a conveying arm pull rod (8).

3. The large-span bulk material conveying system according to claim 1, wherein one end of the first conveying arm (7) close to the tower body (24) is provided with a driving roller, and the tail end of the third conveying arm (1) is provided with a driven roller; the first conveying arm (7), the second conveying arm (4) and the third conveying arm (1) are respectively provided with a grooved carrier roller group, a return carrier roller and a pinch roller; the pinch roller is used to prevent a conveying belt from leaving the carrier roller during the folding and unfolding of the conveying arm, and the unloading trolley (9) can move along the conveying arm.

4. The large-span bulk material conveying system according to claim 1, wherein the tower top (10) is successively provided with three groups of pulley blocks from bottom to top, which are respectively used for the wire rope I (11), the wire rope II (12) and the wire rope III (13) to bypass.

5. The large-span bulk material conveying system according to claim 1, wherein the tower body (24) is provided with the gyration apparatus (23); the gyration apparatus can drive the conveying arm and the balance arm (17) to rotate within a horizontal plane; the hopper (22) can incline relative to the tower body so as to be convenient to wash; and the movement of the gyration apparatus (23) and the unloading trolley (9) is controlled by a programmable control system.

6. The large-span bulk material conveying system according to claim 1, wherein the first distance is a distance from the pulley block on the lower portion of the second conveying arm to one end of the second conveying arm close to the tower body in an unfolded state.

7. The large-span bulk material conveying system according to claim 1, wherein the balance arm (17) is provided with a balance trolley (16) and travel switches; the balance trolley is connected with the windlass IV through a wire rope IV, and the movement of the balance trolley is controlled by the windlass IV (18) which is automatically controlled based on PLC programming; when the conveying arms are in a folded state, an unfolded no-load state, an unfolded medium-load state and an unfolded heavy-load state, the balance trolley moves to the corresponding four positions on the balance arm, and the purpose for the trolley to move to different positions is to balance a tilting torque of the conveying arm in different states; the travel switch is mounted on each position, and the travel switches are respectively named as the travel switch I, the travel switch II, the travel switch III and the travel switch IV from the near to the distant; and the lower end of the balance arm (17) is provided with a hook for connecting the fixed conveyor (109) and using the weight of the fixed conveyor (109) as a balance weight.

8. The large-span bulk material conveying system according to claim 7, wherein the telescopic conveyor (104) comprises a first telescopic conveyor (104.1) and a second telescopic conveyor (104.5); the first telescopic conveyor (104.1) is located above the second telescopic conveyor (104.5); the first telescopic conveyor (104.1) is connected to the middle of the upper supporting plate (102.5) through an arm support connector (102.7); one end of the first telescopic conveyor (104.1) is provided with an angle sensor (104.4) and a striker plate (104.7); a swinging angle of the second telescopic conveyor (104.5) is driven by a leveling oil cylinder (106.1); an arm support trundle (104.3) is arranged below the first telescopic conveyor (104.1), and guide rails (104.6) are arranged above the second telescopic conveyor (104.5); the arm support trundle (104.3) moves on the guide rails (104.6) of the conveyor; the guide rail of the second telescopic conveyor (104.5) is supported by vertical beams (104.10); an oblique beam (104.9) is connected between the two vertical beams; supporting beams (104.8) are arranged between planes where the two guide rails are located; an upper crossbeam (104.12) is arranged below the two guide rails; a lower crossbeam (104.11) is arranged below the upper crossbeam; the left side and right side of a junction between the oblique beam and the upper crossbeam are respectively provided with one supporting beam; and the junction between the vertical beam and the lower crossbeam is provided with one supporting beam.

9. The large-span bulk material conveying system according to claim 8, wherein the windlass (105) is connected with the lifting hook (102.4) through the pulley block; a pitching angle of the amplitude changing conveyor (107) is changed by the hydraulic oil cylinder (106.2); the fixed conveyor (109) is connected with the amplitude changing conveyor (107) through the connector (108); a supporting stand column (110) is mounted below the fixed conveyor (109); the tail end of the fixed conveyor (109) is provided with a hanging rod; the hanging rod (119) can rotate by 90 degrees relative to the fixed conveyor (109); and the hanging rod can be fixed on the hook in a lap joint manner.

\* \* \* \* \*